United States Patent
Kim et al.

(10) Patent No.: US 7,978,581 B2
(45) Date of Patent: *Jul. 12, 2011

(54) MULTI-LAYERED HIGH-DENSITY RECORDING MEDIUM AND OPTICAL POWER ADJUSTING METHOD THEREFOR

(75) Inventors: Jin Yong Kim, Kyunggi-do (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/358,079

(22) Filed: Feb. 22, 2006

(65) Prior Publication Data

US 2006/0140087 A1 Jun. 29, 2006

Related U.S. Application Data

(63) Continuation of application No. 10/468,675, filed as application No. PCT/KR03/01110 on Jun. 5, 2003.

(30) Foreign Application Priority Data

Jun. 7, 2002 (KR) .............................. 2002-0032049

(51) Int. Cl.
  *G11B 7/00* (2006.01)
(52) U.S. Cl. ....................... 369/59.25; 369/94; 369/47.5
(58) Field of Classification Search ........................ None
  See application file for complete search history.

(56) References Cited

U.S. PATENT DOCUMENTS

| | | | |
|---|---|---|---|
| 5,365,507 A | 11/1994 | Fuji et al. | |
| 5,414,451 A | 5/1995 | Sugiyama et al. | |
| 5,608,715 A * | 3/1997 | Yokogawa et al. | ........ 369/275.1 |
| 5,768,221 A | 6/1998 | Kasami et al. | |
| 6,052,347 A | 4/2000 | Miyata | |
| 6,072,759 A | 6/2000 | Maeda et al. | |
| 6,101,162 A | 8/2000 | Kim | |
| 6,172,955 B1 | 1/2001 | Hashimoto | |

(Continued)

FOREIGN PATENT DOCUMENTS

CN 1231473 10/1999

(Continued)

OTHER PUBLICATIONS

Office Action for Japanese Patent Publication No. 2007-121293 dated Oct. 2, 2007.

(Continued)

*Primary Examiner* — Joseph Haley
(74) *Attorney, Agent, or Firm* — Harness, Dickey & Pierce, P.L.C.

(57) ABSTRACT

A multi-layered high-density recording medium and an optical power adjusting method for use with the same. Control information is pre-recorded in a specific area of at least a specific recording layer among the multiple recording layers, wherein the control information and includes each reference power information for respective recording layers. The method includes: (a) reading control information from a specific area of the recording medium, wherein the control information includes each reference power information for respective recording layers and is pre-recorded in the specific area of at least a specific recording layer among the multi recording layers; (b) adjusting a power value to be used for at least one of a recording operation and a reproducing operation at a target recording layer, by referring to the read control information; and (c) performing at least one of the recording and reproducing operations based on the adjusted power value.

15 Claims, 6 Drawing Sheets

U.S. PATENT DOCUMENTS

| | | | |
|---|---|---|---|
| 6,370,102 | B1 | 4/2002 | Mons et al. |
| 6,404,713 | B1 | 6/2002 | Ueki |
| 6,510,128 | B2 | 1/2003 | Sekii |
| 6,512,731 | B1 | 1/2003 | Seo et al. |
| 6,606,285 | B1 | 8/2003 | Ijtsma et al. |
| 6,611,492 | B2 | 8/2003 | Akimori et al. |
| 6,728,177 | B2 | 4/2004 | Seong |
| 6,728,186 | B2 | 4/2004 | Weijenbergh et al. |
| 6,801,494 | B2 | 10/2004 | Ross |
| 6,842,412 | B2 | 1/2005 | Ushiyama |
| 6,845,071 | B2 * | 1/2005 | Shoji et al. |
| 6,859,426 | B1 * | 2/2005 | Ogawa et al. ............ 369/47.53 |
| 6,917,572 | B2 | 7/2005 | Iida et al. |
| 7,295,762 | B2 | 11/2007 | Sawabe et al. |
| 7,376,058 | B2 | 5/2008 | Narumi et al. |
| 2002/0021656 | A1 | 2/2002 | Tsukagoshi |
| 2002/0122365 | A1 | 9/2002 | Ueki |
| 2003/0048733 | A1 | 3/2003 | Heemskerk et al. |
| 2003/0063535 | A1 | 4/2003 | Shoji et al. |
| 2003/0072233 | A1 | 4/2003 | Naoi et al. |
| 2003/0081523 | A1 | 5/2003 | Miyagawa |
| 2003/0137909 | A1 | 7/2003 | Ito et al. |
| 2003/0169651 | A1 | 9/2003 | Kobayashi |
| 2003/0210627 | A1 | 11/2003 | Ijtsma et al. |
| 2004/0085874 | A1 | 5/2004 | Akiyama et al. |

FOREIGN PATENT DOCUMENTS

| | | |
|---|---|---|
| CN | 01116247.3 | 2/2001 |
| EP | 0 768 652 | 10/1996 |
| EP | 0 899 735 | 3/1999 |
| EP | 1 300 836 | 4/2003 |
| EP | 1 329 880 | 7/2003 |
| JP | 61-206438 | 11/1986 |
| JP | 61-260438 | 11/1986 |
| JP | 03-157816 | 7/1991 |
| JP | 03-290872 | 12/1991 |
| JP | 05-028644 | 2/1993 |
| JP | 05-101398 | 4/1993 |
| JP | 05-189765 A | 7/1993 |
| JP | 08-096406 | 4/1996 |
| JP | 08-212561 | 8/1996 |
| JP | 09-231613 | 9/1997 |
| JP | 10-011755 | 1/1998 |
| JP | 10-11755 A | 1/1998 |
| JP | 10-228645 | 8/1998 |
| JP | 10-241167 | 9/1998 |
| JP | 10-320926 | 12/1998 |
| JP | 11-025608 | 1/1999 |
| JP | 11-242565 | 9/1999 |
| JP | 12-311346 A | 11/2000 |
| JP | 2000-322875 | 11/2000 |
| JP | 2001-0147808 | 1/2001 |
| JP | 13-052337 A | 2/2001 |
| JP | 2001-086195 | 3/2001 |
| JP | 2001-143402 | 5/2001 |
| JP | 2001-209940 | 8/2001 |
| JP | 2001-319357 | 11/2001 |
| JP | 2002-050053 | 2/2002 |
| JP | 2002-352430 | 12/2002 |
| JP | 2003-030842 | 1/2003 |
| JP | 2003-178448 | 6/2003 |
| KR | 10-1997-0055600 | 10/1997 |
| TW | 484135 | 4/2002 |
| WO | WO 96/19807 | 6/1996 |
| WO | WO 01/22416 | 3/2001 |
| WO | WO 03/019543 | 3/2003 |

OTHER PUBLICATIONS

Office Action for Japanese Patent Publication No. 2007-121293 dated Jun. 10, 2008.
Office Action for corresponding U.S. Appl. No. 10/468,675 dated Jul. 9, 2008.
Office Action for European patent application No. 03757211.2-2210/1518228 dated Jun. 27, 2008.
Search Report for international patent application No. PCT/KR03/01116 dated Oct. 6, 2003.
Office Action for Chinese patent application No. 03800989.7 dated Feb. 10, 2006.
Office Action for U.S. Appl. No. 10/485,914 dated Feb. 22, 2006.
Office Action for Japanese patent application No. 2004-512132 dated Nov. 14, 2006.
Office Action for Japanese patent application No. 2006-194024 dated Jun. 5, 2007.
Office Action for U.S. Appl. No. 11/499,663 dated Jul. 24, 2007.
Office Action for Japanese patent application No. 2006-194024 dated Oct. 30, 2007.
Office Action for Korean patent application No. 10-2002-0032183 dated Aug. 21, 2008.
Office Action for U.S. Appl. No. 11/499,663 dated Oct. 29, 2008.
Office Action for U.S. Appl. No. 10/468,675 dated Jul. 7, 2009.
Office Action for U.S. Appl. No. 10/485,914 dated Mar. 20, 2009.
Search Report for European patent application No. 07017017.0 dated Mar. 16, 2009.
ECMA: Standardizing Information and Communication Systems: "Standard ECMA-272, $2^{nd}$ edition: 120 mm DVD Rewritable Disk (DVD-RAM)" Standard ECMA-272, XX, XX, No. 272, Jun. 1, 1999, pp. 43-55, XP002186767.
Office Action by the Japanese Patent Office dated Apr. 27, 2010 for JP 2006-194024, without translation.
JIS-X-6243 "120mm DVD-RAM" (without translation).
Japanese Office Action issued in corresponding Japanese application No. 2007-121293, no English translation.
Japanese Office Action dated Feb. 22, 2011 issued in corresponding Japanese application No. 2007-121293.
Taiwanese Office Action dated Mar. 7, 2011 issued in corresponding Taiwanese application No. TW 92115451.

* cited by examiner

*Background Art*

| PIC Data Zone | Disc Information ID |
|---|---|
| | ⋮ |
| | disc_structure ('00000000') = DL |
| | ⋮ |
| | Maximum dc read power for Layer 1 |
| | Maximum dc read power for Layer 2 |
| | Maximum HF modulated read power for Layer 1 |
| | Maximum HF modulated read Power for Layer 2 |
| | ⋮ |
| | Write power setting at Nominal Recording Velocity for Layer 1 |
| | Write power setting at Nominal Recording Velocity for Layer 2 |
| | Write power setting at Maximum Recording Velocity for Layer 1 |
| | Write power setting at Maximum Recording Velocity for Layer 2 |
| | Write power setting at Minimum Recording Velocity for Layer 1 |
| | Write power setting at Minimum Recording Velocity for Layer 2 |
| | ⋮ |

■ MSK (Minimum Shift Keying) mark
☐ monotone wobble
◨ sawtooth wobble representting a "0"
◪ sawtooth wobble representting a "1"

FIG. 9B

| ADIP Unit Number | ADIP Unit Type | ADIP Nibble Bit Number | ADIP Codeword Nibble Number |
|---|---|---|---|
| 0 | monotone | — | |
| 1 | sync_0 | — | |
| 2 | monotone | — | |
| 3 | sync_1 | — | |
| 4 | monotone | — | — |
| 5 | sync_2 | — | |
| 6 | monotone | — | |
| 7 | sync_3 | — | |
| 8 | reference | — | |
| 9 | data_x | b3 | |
| 10 | data_x | b2 | c0 |
| 11 | data_x | b1 | |
| 12 | data_x | b0 | |
| ⋮ | ⋮ | — | — |
| 8+i*5 | reference | — | — |
| 9+i*5 | data_x | b3 | |
| 10+i*5 | data_x | b2 | ci |
| 11+i*5 | data_x | b1 | |
| 12+i*5 | data_x | b0 | |
| ⋮ | ⋮ | — | — |
| 78 | reference | — | — |
| 79 | data_x | b3 | |
| 80 | data_x | b2 | c14 |
| 81 | data_x | b1 | |
| 82 | data_x | b0 | |

MULTI-LAYERED HIGH-DENSITY RECORDING MEDIUM AND OPTICAL POWER ADJUSTING METHOD THEREFOR

CROSS-REFERENCE TO RELATED APPLICATION

This continuation application claims the priority under 35 U.S.C. §120 upon U.S. patent application Ser. No. 10/468, 675 (hereafter, the "parent application"), filed on Aug. 21, 2003, the entirety of which hereby is incorporated by reference. The parent application is the national phase under 35 U.S.C. §371 of PCT International Application No. PCT/KR03/01110 that has an International filing date of Jun. 5, 2003 and which is designated in the United States of America, the entirety of which hereby is incorporated by reference.

TECHNICAL FIELD

One or more embodiments of the present invention relates to a multi-layered high-density recording medium and an optical power adjusting method therefor.

BACKGROUND

Recently, the standardization for Blu-ray Rewritable (referred to as BD-RE hereinafter), which is a new high-density rewritable optical disk, capable of recording high-quality video and audio data for a long time, is in rapid progress. BD-RE related products will be available on the market when the standardization is completed.

Figure 1:
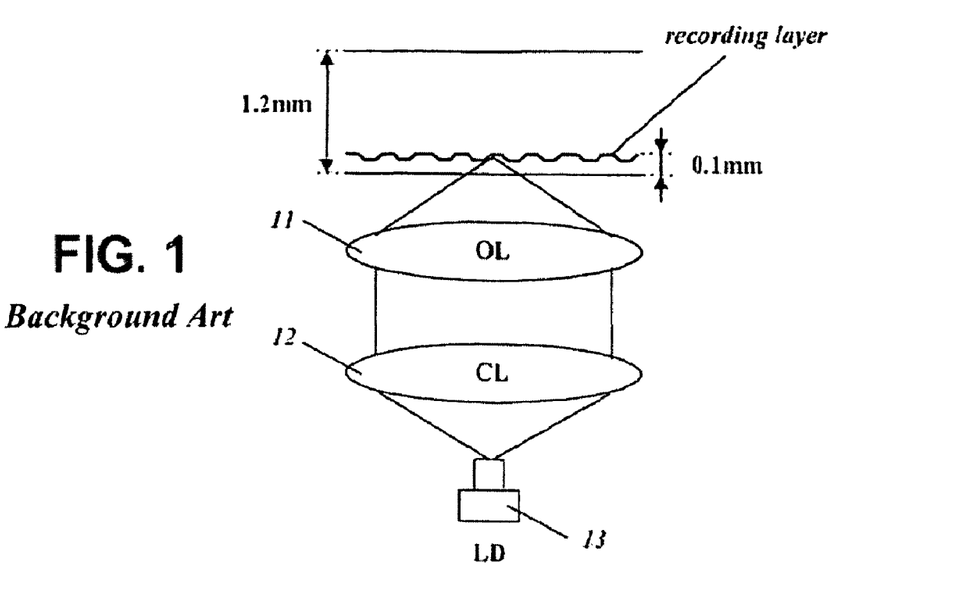
FIG. 1 illustrates the structure of a single-layered disk and an optical pickup for accessing the disk, according to the Background Art.

The data recording layer of a single-layered BD-RE disk is located at a distance of 0.1 mm from the disk surface in the direction normal to an objective lens 11 contained in an optical pickup, as illustrated in FIG. 1.

For recording/reproducing data on/from the recording layer of the BD-RE, the laser power of a laser diode (LD) 13 contained in the optical pickup is adjusted according to the operation mode, which will be described in detail below.

Figure 2:
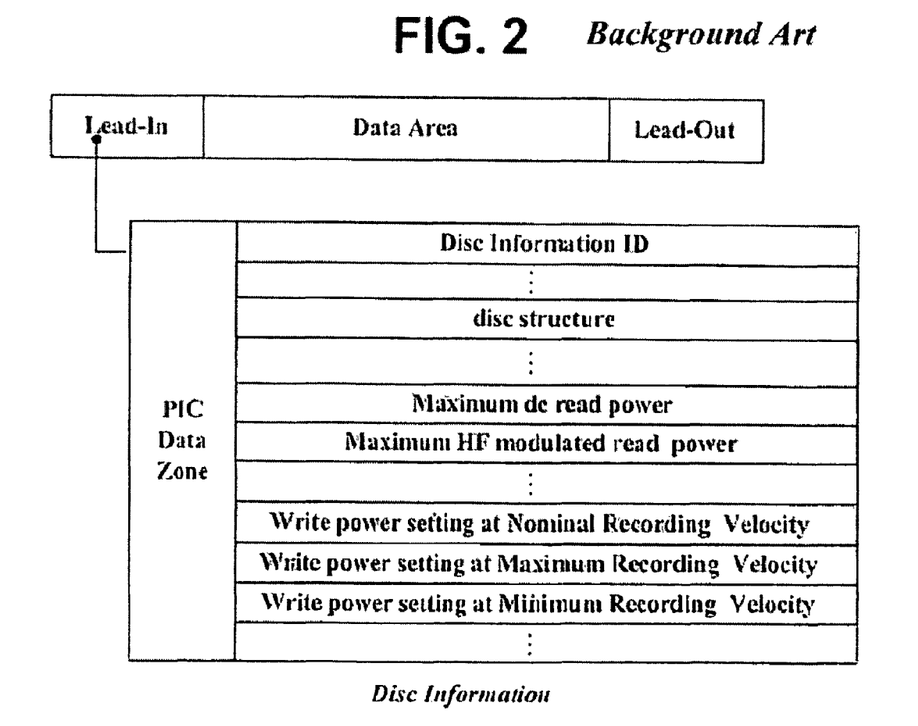
FIG. 2 illustrates a table of disk information recorded in the lead-in area of a single-layered BD-RE, according to the Background Art.

FIG. 2 shows a table of disk information recorded in the lead-in area of a conventional single-layered BD-RE. The lead-in area comprises a pre-recorded area and a rewritable area and the pre-recorded area includes a PIC (Permanent Information & Control) data zone.

As illustrated in FIG. 2, information such as the disk information ID, the disk structure, a maximum DC read power and a maximum high-frequency modulated read power for adjusting read power is recorded in the PIC data zone.

Also, write power settings at a normal recording velocity, write power settings at a maximum recording velocity, and write power settings at a minimum recording velocity for adjusting write power are recorded in the PIC data zone.

An optical disk apparatus in which the BD-RE having the information shown in FIG. 2 is placed adjusts the amount of the current that flows through the LD contained in the optical pickup optimal to the present operation mode by referring to the disk information stored in the PIC data zone before beginning to reproduce data recorded on the recording layer of the BD-RE or to record data on the recording layer of the ED-RE.

Figure 3:
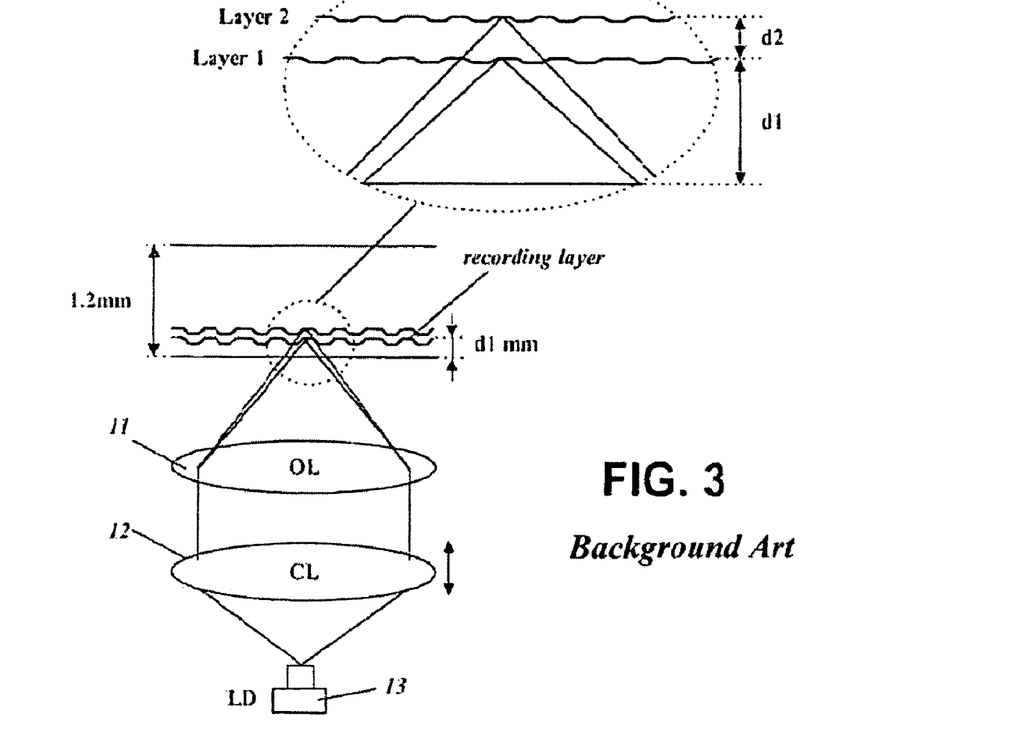
FIG. 3 illustrates the structure of a dual-layered disk and an optical pickup for accessing the disk, according to the Background Art.

On the other hand, dual-layered BD-RE disks having a storage capacity twice as much as that of a single-layered BD-RE disk have been proposed. A dual-layered BD-RE has two recording layers, Layer 1 and Layer 2, located at a prescribed distance (d2) away from each other, as illustrated in FIG. 3.

The optical power of the LD 13 needs to be adjusted appropriately for recording data on a selected layer or reproducing data from a layer in the same way as the case for a single-layered disk. If optical power related information only for either of the layers is recorded or an identical optical power is employed for both layers, the recording/reproducing performance is likely to be deteriorated on one of the two layers. For example, suppose that an optical read power set appropriately for Layer 1 is used to read data recorded on Layer 2. A portion of the laser beam reflected by Layer 2 is reflected again by Layer 1 located below. Also, a portion of the laser beam created by the LD 13 is reflected by Layer 1 before reaching Layer 2, which results in an optical loss. For these reasons, the data recorded on Layer 2 may not be read successfully, though data reproduction from Layer 1 is successful.

As a result, it is required to maintain optical power related information for each of the recording layers separately. Optical power related data for Layer 1 is recorded in the lead-in area of Layer 1 and optical power related data for Layer 2 is recorded in the lead-out area of Layer 2. When jumping from Layer 1 to Layer 2 in the middle of a reproducing/reading operation on Layer 1, the reproducing/reading operation on Layer 2 cannot start immediately after the jump. Rather, there is a delay until the optical power related information recorded on the lead-out area of Layer 2 is accessed.

SUMMARY

At least one embodiment of the present invention solves the foregoing problems. One or more example embodiments of the present invention provide a multi-layered high-density recording medium and an optical power adjusting method, respectively, by which optical power can be adjusted relative to (if not optimally to) each of the recording layers substantially immediately after a layer jump operation is performed, thereby allowing a fast start of a read/write operation after the layer jump.

An example embodiment of the present invention provides a method of recording or reproducing data on or from a recording medium having multi-recording-layer structure, the method comprising: (a) reading control information from a specific area of the recording medium, wherein the control information includes each reference power information for respective recording layers and is pre-recorded in the specific area of at least a specific recording layer among the multi recording layers; (b) adjusting a power value to be used for at least one of a recording operation and a reproducing operation at a target recording layer, by referring to the read control information; and (c) performing at least one of the recording and reproducing operations based on the adjusted power value.

An example embodiment of the present invention provides a recording medium having multi-recording-layer structure, wherein control information is pre-recorded in a specific area of the recording medium, wherein the control information includes each reference power information for respective recording layers and is pre-recorded in the specific area of at least a specific recording layer among the multiple recording layers.

An example embodiment of the present invention provides a method of recording data on a recording medium having a multi-recording-layer structure, the method comprising: (a) generating control information including each reference power information for respective recording layers; and (b) recording the control information in a specific area of at least a specific recording layer of the recording medium.

At least one of the high-density multi-layered optical disks and the optical power adjustment methods in accordance with embodiments of the present invention, respectively, can provide fast optical power adjustment capability and thereby can reduce if not prevent a momentary pause of recording/reproducing operation even in case of layer jumps.

Additional features and advantages of the present invention will be more fully apparent from the following detailed description of example embodiments, the accompanying drawings and the associated claims.

BRIEF DESCRIPTION OF THE DRAWINGS

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

In order that the present invention may be fully understood, example embodiments thereof will now be described with reference to the accompanying drawings.

Figure 4:
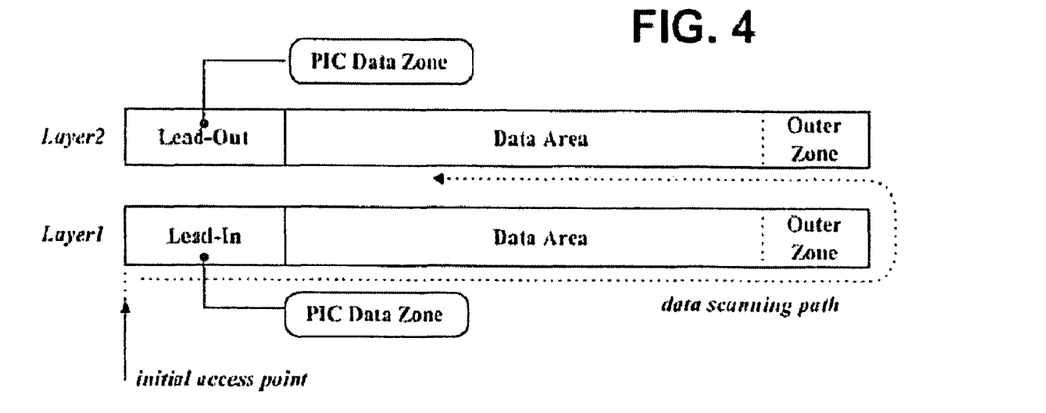
FIG. 4 illustrates PIC data zones assigned to lead-in and lead-out areas of a high-density dual-layered optical disk in accordance with an embodiment of the present invention.

FIG. 4 illustrates the structure of a dual-layered BD-RE disk in accordance with an embodiment of the present invention, wherein a lead-in area and a lead-out area of the disk exist on Layer 1 and Layer 2 respectively and each layer has an outer zone in the outer-diameter of the disk.

The lead-in area of Layer 1 and lead-out area of Layer 2 include separate PIC data zones that contain the same optical power related data for adjusting read/write optical power for both recording layers.

Figure 5:
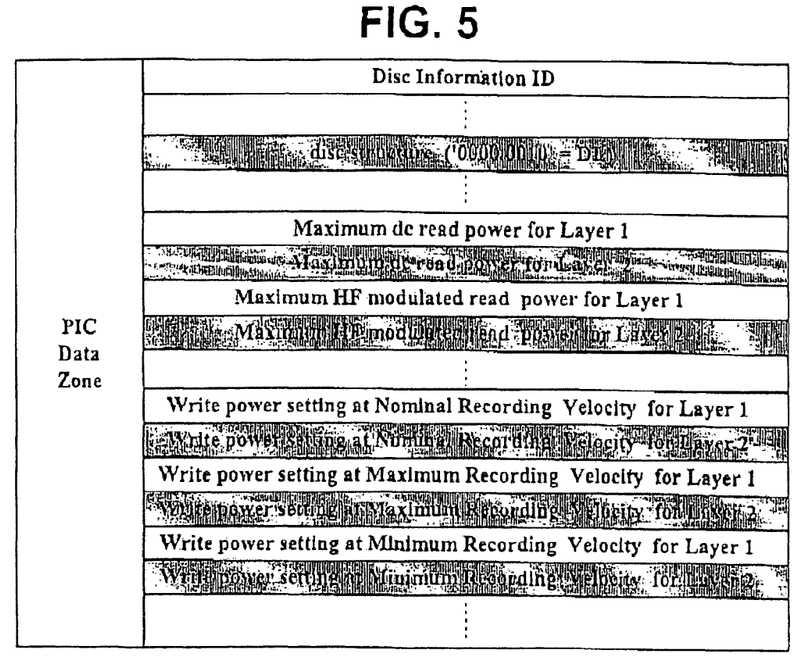
FIG. 5 illustrates a table of disk information stored in the PIC data zone assigned in a dual-layered optical disk in accordance with an embodiment of the present invention.

In other words, the PIC data zones recorded in the lead-in area of Layer 1 and lead-out area of Layer 2 contain the same disk information. As illustrated in FIG. 5, the disk information includes disk information ID and disk structure information. The disk structure information is an identification number indicative of a dual-layered optical disk. The identification number may indicate the number of recording layers. For example, '0000 0011' indicates a three-layer disk, '0000 0010' indicates a dual-layered disk (and is the non-limiting sample value assumed and depicted in FIG. 5), and '0000 0001' indicates a single-layered disk.

The disk information further includes a maximum DC read power for Layer 1, a maximum DC read power for Layer 2, a maximum high-frequency modulated read power for Layer 1, and a maximum high-frequency modulated read power for Layer 2. Such information in whole or in part can be used for adjusting read powers appropriately to Layer 1 and Layer 2.

The disk information further can include write power settings at a normal recording velocity for Layer 1, write power settings at a normal recording velocity for Layer 2, write power settings at a maximum recording velocity for Layer 1, write power settings at a maximum recording velocity for Layer 2, write power settings at a minimum recording velocity for Layer 1, and write power settings at a minimum recording velocity for Layer 2. Such information in whole or in part can be used for adjusting write powers appropriately to Layer 1 and Layer 2.

In case of a three-layer optical disk, the disk information includes optical power related information corresponding to each of three recording layers. Likewise, in case of an N-layer optical disk, the disk information includes optical power related information corresponding to each of N recording layers.

Figure 6:
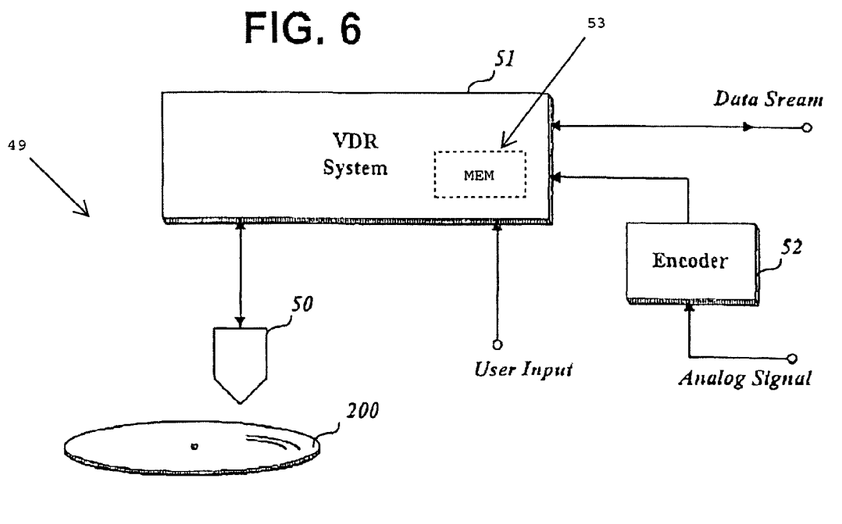
FIG. 6 illustrates an optical disk apparatus according to an embodiment of the present invention.

FIG. 6 illustrates a block diagram of an optical disk apparatus such as a video disk recorder (VDR) adapted to such disk arrangements and thus represents an embodiment of the present invention. The optical disk apparatus comprises an optical pickup 50 for reading recorded signals from a dual-layered BD-RE disk 200 or for recording external input data on the BD-RE disk 200, a VDR system 51 for processing the signals received from the optical pickup 50 or for converting an input data stream into a data stream formatted for recording, and an encoder 52 for encoding an external analog input signal and outputting the encoded signal to the VDR system 51.

Figure 7:
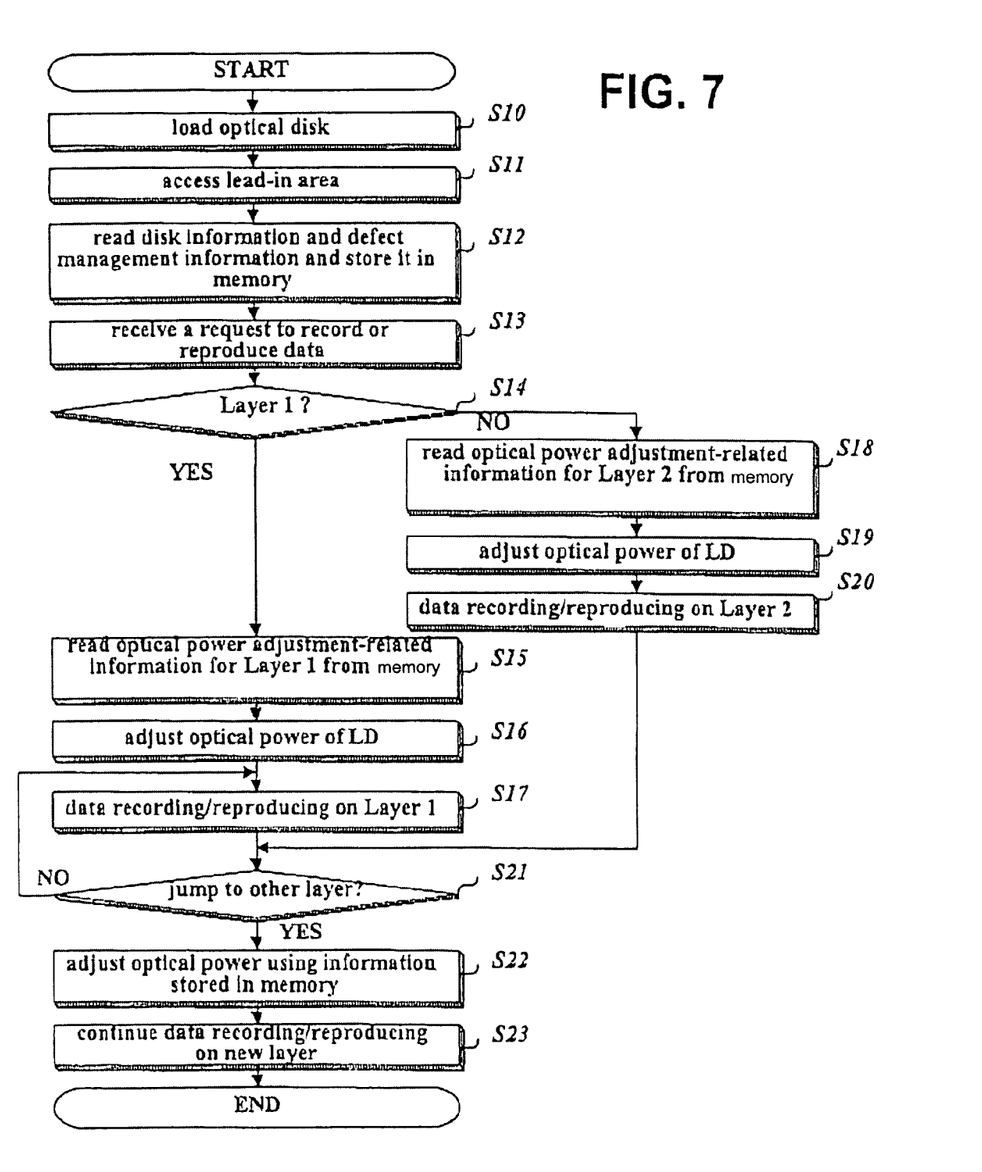
FIG. 7 illustrates a flow diagram of an optical power adjusting method in accordance with an embodiment of the present invention.

FIG. 7 illustrates a flow diagram of recording/reproducing data on/from a dual-layered BD-RE disk according to an embodiment of the present invention, e.g., BD-RE disk, 200 in the optical disk apparatus shown in FIG. 6.

Once the dual-layered BD-RE disk 200 is inserted, the VDR system 51 starts a disk loading operation (S10).

Then the optical disk apparatus accesses the lead-in area located on Layer 1 of the dual-layered BD-RE 200 by moving the optical pickup 50 (S11) and performs a pre-read/pre-write operation of reading the disk information and defect address management information (called 'DMA') recorded in the lead-in area and storing (S12) the read information in a memory 53, e.g., a volatile type of memory, contained in the optical disk apparatus 49. Optical power related information is read once by the pre-read/pre-write operation.

If a request to record data on BD-RE 200 or to reproduce data from BD-RE 200 is received (S13), the VDR system 51 examines for which layer the request is issued.

If the request is associated with Layer 1 (S14), the VDR system 51 searches the disk information stored in the memory 53 for the optical power related data for Layer 1 (S15).

Then the optical disk apparatus adjusts the read/write optical power of the LD contained in the optical pickup 50 according to the read optical power related data for Layer 1 (S16).

After the optical power adjustment operation finishes, the optical disk apparatus begins the requested read/write operation on Layer 1 (S17).

If the received request to read data or to record data is associated with Layer 2, the VDR system 51 searches the disk information stored in the memory 53 for the optical power related data for Layer 2 included in the disk information (S18), adjusts the read/write optical power of the LD according to the read optical power related data for Layer 2 (S19), and performs the requested read/write operation (S20).

If a request for a layer jump, for example, a jump from Layer 1 to Layer 2, is received while a read/write operation is being performed (S21), the VDR system 51 adjusts the optical power of the LD suitably for Layer 2 by consulting (S22) the optical power adjustment-related information for Layer 2 stored in the memory 53 before starting a read/write operation on Layer 2 (S23).

Consequently, in the case of jump operations, a data read/write operation can resume immediately after the jump operation without an additional latency, e.g., as contrasted with the Background Art.

Figure 8:
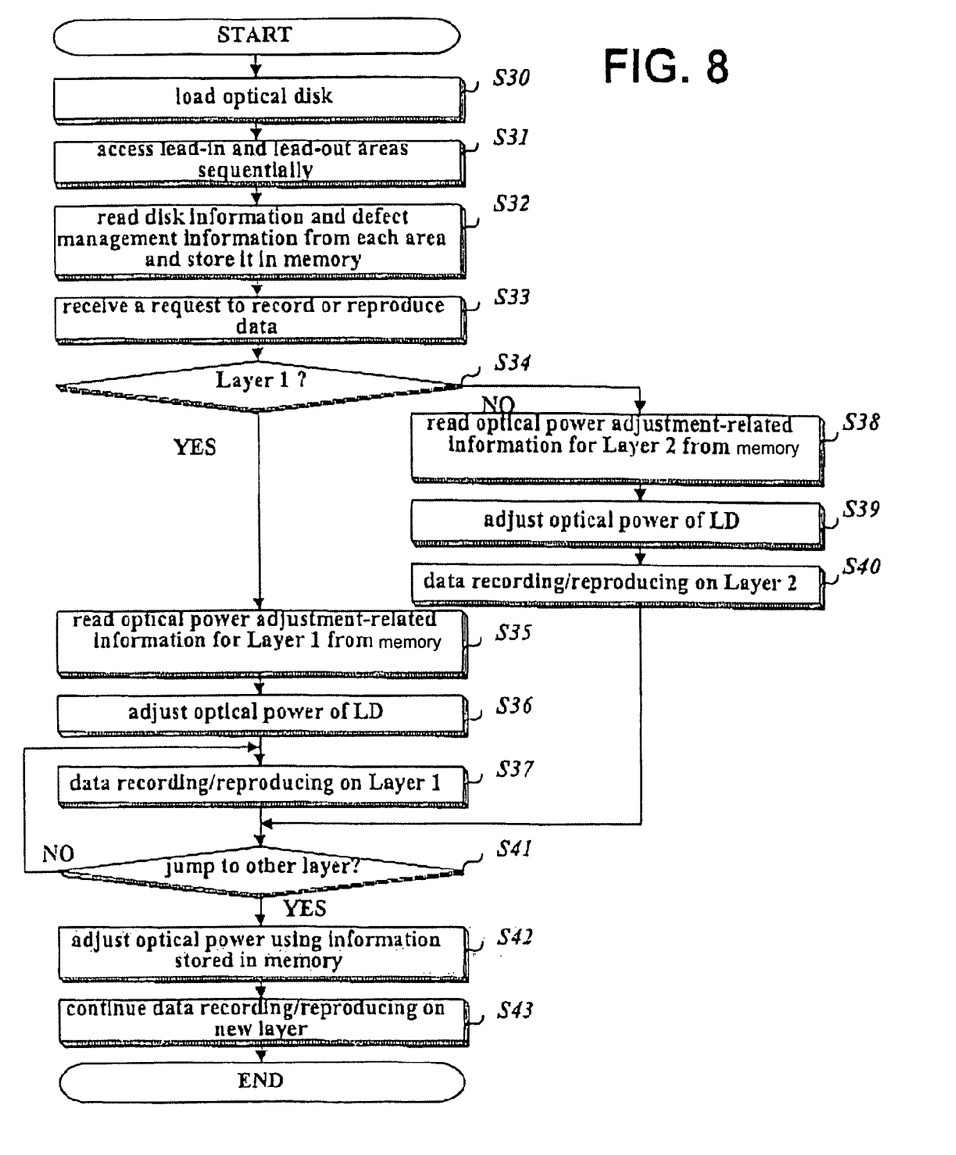
FIG. 8 illustrates a flow diagram of an optical power adjusting method in accordance with an embodiment of the present invention.

FIG. 8 illustrates a flow diagram of an optical power adjustment method in accordance with an embodiment of the present invention, wherein optical power adjustment-related information for Layer 1 is recorded only in the lead-in area of Layer 1 and optical power adjustment-related information for Layer 2 is recorded only in the lead-out area of Layer 2.

Once the dual-layered BD-RE disk 200 is inserted, the VDR system 51 starts a disk loading operation (S30).

Then the optical disk apparatus accesses the lead-in area located on Layer 1 and the lead-out area located on Layer 2 successively by moving the optical pickup 50 (S31) and reads the disk information and defect address management information to store (S32) the read information in the memory 53 contained in the optical disk apparatus 49. Disk information (including optical power-related information) recorded on every one of the recording layers is read once in this manner before the requested read/write operation.

If a request to record data on BD-RE 200 or to reproduce data from BD-RE 200 is received (S33), the VDR system 51 examines for which layer the request is issued.

If the request is associated with Layer 1 (S34), the VDR system 51 searches the disk information stored in the memory 53 for the optical power related data for Layer 1 (S35).

Then the optical disk apparatus adjusts the read/write optical power of the LD contained in the optical pickup 50 according to the read optical power related data for Layer 1 (S36).

After the optical power adjustment operation finishes, the optical disk apparatus begins the requested read/write operation on Layer 1 (S37).

If the received request to read data or to record data is associated with Layer 2, the VDR system 51 searches the disk information stored in the memory 53 for the optical power related data for Layer 2 included in the disk information (S38), adjusts the read/write optical power of the LD according to the read optical power related data for Layer 2 (S39), and performs the requested read/write operation (S40).

If a request for a layer jump, for example, a jump from Layer 1 to Layer 2, is received while a read/write operation is being performed (S41), the VDR system 51 adjusts the optical power of the LD suitably for Layer 2 by consulting (S42) the optical power adjustment-related information for Layer 2 stored in the memory 53 before starting a read/write operation on Layer 2 (S43).

Consequently, though optical power adjustment-related information for each recording layer is stored only on the corresponding layer, a data read/write operation can resume immediately after a jump operation without an additional latency, e.g., as contrasted with the Background Art.

Instead of recording the optical power adjustment-related information in the PIC data zone assigned to the lead-in and lead-out areas as described above, it is possible to record the optical power adjustment-related information in the ADIP (Address In Pregroove) encoded in wobble tracks. The ADIP formation format is as follows.

Figure 9A:
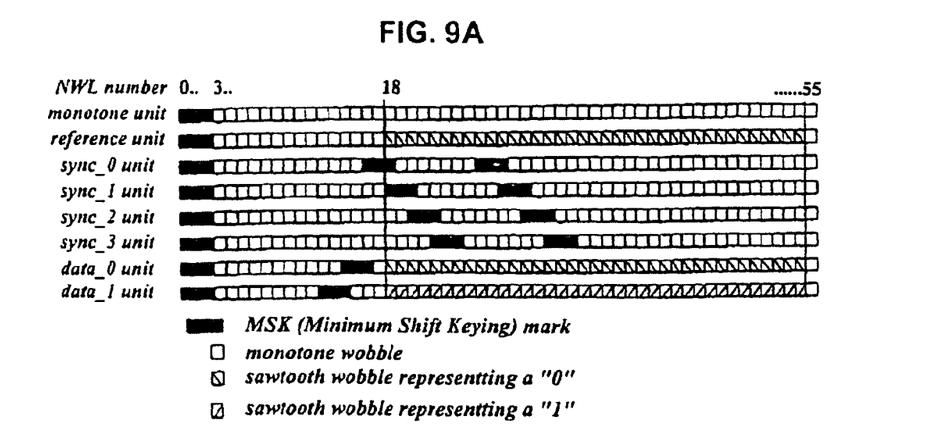
FIGS. 9a and 9b illustrate the structure of ADIP words in which optical power adjustment-related information for a plurality of recording layers is stored, according to an embodiment of the present invention.
Figure 9B:
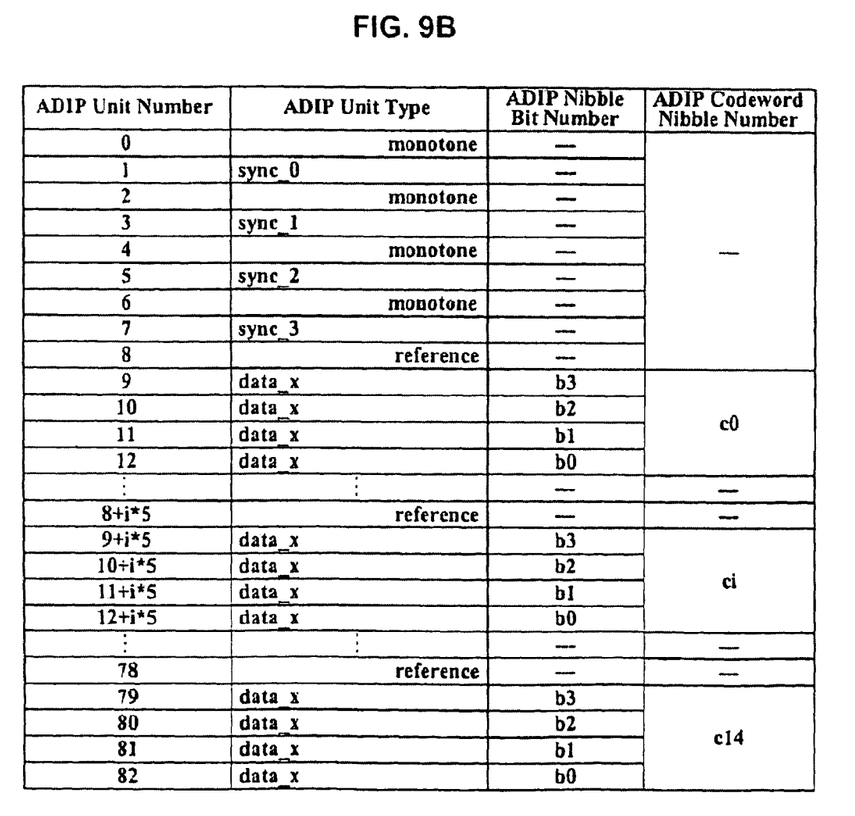

There are 56 nominal wobble lengths (NWLs) that constitute an ADIP unit. An ADIP unit has 9 different types as illustrated in FIG. 9*a*. 83 ADIP units in turn constitute an ADIP word. FIG. 9*b* illustrates the format of an ADIP word. As shown in FIG. 9*b*, an ADIP word may contain 60-bit data (nibbles c0-c14), which are recorded by encoding for error correction and hence contain 36 information bits.

There are 24 bits of the 36 information bits that are used as an ADIP address and the remaining 12 bits are used as auxiliary information. Since an ADIP word can store 12-bit auxiliary information, N ADIP words are grouped to secure a space enough for storing optical power adjustment-related information and the optical power adjustment-related information for all the layers is stored there. The information is stored repeatedly in groups of N ADIP words.

Although certain specific embodiments of the present invention have been disclosed, it is noted that the present invention may be embodied in other forms without departing from the spirit or essential characteristics thereof. The present embodiments are therefore to be considered in all respects as illustrative and not restrictive, the scope of the present invention being indicated by the appended claims, and all changes that come within the meaning and range of equivalency of the claims are therefore intended to be embraced therein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

What is claimed:

1. A method of recording or reproducing data on or from a recording medium having multi-recording-layer structure, comprising:

reading each control information from a specific area of each recording layer of the recording medium, wherein a first recording layer includes only first control information for the first recording layer and a second recording layer includes only second control information for the second recording layer, wherein reading the first control information from the first recording layer and the second control information from the second recording layer sequentially and said each control information includes reference power information for a corresponding recording layer and wherein the first and second control information are recorded as wobbled patterns in the specific area of each recording layer, and further wherein the wobbled patterns comprise ADIP (Address In Pre-Groove) units, a plurality of ADIP units comprises one or more ADIP words, and the control information is included in ADIP words;

storing the read control information in a memory associated with an optical disc apparatus;

adjusting a power value to be used for at least one of a recording operation and a reproducing operation at a target recording layer, by referring to the read control information stored in the memory without reading the control information from the recording medium; and performing at least one of the recording and reproducing operations based on the adjusted power value.

2. The method of claim 1, wherein the reference power information includes read power data for the corresponding recording layer, wherein the adjusting step adjusts a power value for reproducing operation based on the read power data.

3. The method of claim 2, wherein the read power data includes maximum DC read power data and maximum high-frequency modulated read power data.

4. The method of claim 1, wherein the reference power information includes write power data for the corresponding recording layer, wherein the adjusting step adjusts a power value for the recording operation based on the write power data.

5. The method of claim 4, wherein the write power data includes write power data for a maximum recording velocity and write power data for a minimum recording velocity.

6. The method of claim 5, wherein the write power data further includes write power data for a normal recording velocity.

7. The method of claim 1, wherein at least one of the first control information and the second control information includes structure information indicative of the number of multi recording layers, the method further comprising:
   identifying the recording medium based on the structure information.

8. An apparatus for recording or reproducing data on or from a recording medium having multi-recording-layer structure, comprising:
   a reading/writing unit configured to read each control information from a specific area of each recording layer of the recording medium and write or read data to or from the recording medium, wherein a first recording layer includes only first control information for the first recording layer and a second recording layer includes only second control information for the second recording layer, wherein the reading/writing unit reads the first control information from the first recording layer and the second control information from the second recording layer sequentially according to the control of the controller and said each control information includes reference power information for a corresponding recording layer, wherein the first and second control information are recorded as wobbled patterns in the specific area of each recording layer, and further wherein the wobbled patterns comprise ADIP (Address In Pre-Groove) units, a plurality of ADIP units comprises one or more ADIP words, and the control information is included in ADIP words;
   a memory configured to store the control information read from the recording medium; and
   a controller configured to control the reading/writing unit to read the control information from the specific area of each recording layer or to read the control information from the memory, to adjust a power value of the reading/writing unit to be used for recording or reproducing operation at a target recording layer by referring to the read control information from the memory without reading the control information from the recording medium, and to control a recording or reproducing operation based on the adjusted power value.

9. The apparatus of claim 8, wherein the reference power information includes read power data for the corresponding recording layer, wherein the controller is further configured to control the reading/writing unit to adjust a power value for the reproducing operation based on the read power data.

10. The method of claim 9, wherein the read power data includes one of maximum DC read power data and maximum high-frequency modulated read power data.

11. The apparatus of claim 8, wherein the reference power information includes write power data for the corresponding recording layer, wherein the controller is further configured to control the reading/writing unit to adjust a power value for the recording operation based on the write power data.

12. The apparatus of claim 11, wherein the write power data includes at least one of write power data for a maximum recording velocity, write power data for a minimum recording velocity and write power data for a normal recording velocity.

13. The apparatus of claim 8,
   wherein at least one of the first control information and the second control information includes structure information indicative of the number of multi recording layers, and the controller is further configured to identify the recording medium based on the structure information.

14. The method of claim 1, further comprising:
   reading the reference power information for another recording layer stored in the memory without reading the reference power information from the recording medium and adjusting an actual write power according to the read reference power information if a layer jump operation is required.

15. The apparatus of claim 8, wherein the controller is further configured to obtain the reference power information for another recording layer stored in the memory without obtaining the reference power information from the recording medium and adjust an actual write power according to the read reference power information if a layer jump operation is required.

* * * * *